United States Patent [19]
Anderson et al.

[11] Patent Number: 5,754,980
[45] Date of Patent: May 19, 1998

[54] METHOD OF PROVIDING FOR A FUTURE BENEFIT CONDITIONED ON LIFE EXPECTANCIES OF BOTH AN INSURED AND A BENEFICIARY

[75] Inventors: Bennett R. Anderson, Oklahoma City; Dean M. Potter, Edmond; Thomas A. Dearmon, Oklahoma City, all of Okla.

[73] Assignee: Century Associates L.L.C., Oklahoma City, Okla.

[21] Appl. No.: 448,970

[22] Filed: May 24, 1995

[51] Int. Cl.$^6$ ............................ G06F 17/60; G06G 7/52
[52] U.S. Cl. ............................................. 705/14; 705/35
[58] Field of Search ........................... 364/401 R, 406, 364/408; 395/201, 204, 235, 236, 237; 705/1, 4, 35, 38, 40, 45

[56] References Cited

U.S. PATENT DOCUMENTS

| | | | |
|---|---|---|---|
| 4,722,055 | 1/1988 | Roberts | 364/408 |
| 4,766,539 | 8/1988 | Fox | 364/401 |
| 5,025,138 | 6/1991 | Cuervo | 235/379 |
| 5,231,571 | 7/1993 | D'Agostino | 364/408 |
| 5,291,398 | 3/1994 | Hagan | 364/408 |
| 5,523,942 | 6/1996 | Tyler et al. | 364/401 |

OTHER PUBLICATIONS

Dialog Abstract: File 751, Acc#00272700; Vantage–One Administration System; The Continuum Company; First Installed: Jan. 1985.

Dialog Abstract: File 751, Acc#00242936; Life Support Plus 4.1; Genelco, Inc. First Installed: Jun. 1985.

Potter; "UK: The Role of Annuities in Life Assurance"; *Insurance Age;* Apr. 24, 1990; p. 24; Dialog: File 772, Acc#04647289.

"UK: The Purchased Life Annuity—Not So Boring After All"; *Planned Savings;* Aug. 27, 1990; pp. 31–35; Dialog: File 772, Acc#05149511.

Sherrid; "A Retiree's Inflation Beater"; *U.S. News & World Report;* v116 n10; p.75(3);Dialog: File 148, Acc#07195554.

Blease; "Status of Annuities is Increasingly Fragile"; *Best's Review (Life/Health);* v95 n1; pp. 62–65; May 1994; Dialog: File 15, Acc#00860079.

Lee; "A Buyer's Guide to Life Insurance; Fatal Distractions"; *Canadian Business;* v61 n7; p.40(7); Jul. 1988; Dialog: File 148, Acc# 03687263.

Kennedy; "Don't Overlook Annuities"; *D&B Reports;* v42 n2; p. 53; Mar./Apr. 1993; Dialog: File 15; Acc# 00684520.

"Society of Actuaries' Textbook on Life Contingencies," by Chester Wallace Jordan, Jr., 1975, pp. 255–264.

"Life Insurance" (Eleventh Edition, Revised), by Kenneth Black, Jr. and Harold D. Skipper, Jr., published more than one year prior to the filing date (copyright dates 1987 and prior), p. 111.

*Primary Examiner*—Gail O. Hayes
*Assistant Examiner*—Stephen R. Tkacs
*Attorney, Agent, or Firm*—McAfee & Taft

[57] ABSTRACT

A method of providing for a future stream of payments solely to a beneficiary who survives an insured utilizes data including the ages of both the insured and one specific beneficiary to define a premium for providing funding for the potential future liability to the specific beneficiary.

11 Claims, 2 Drawing Sheets

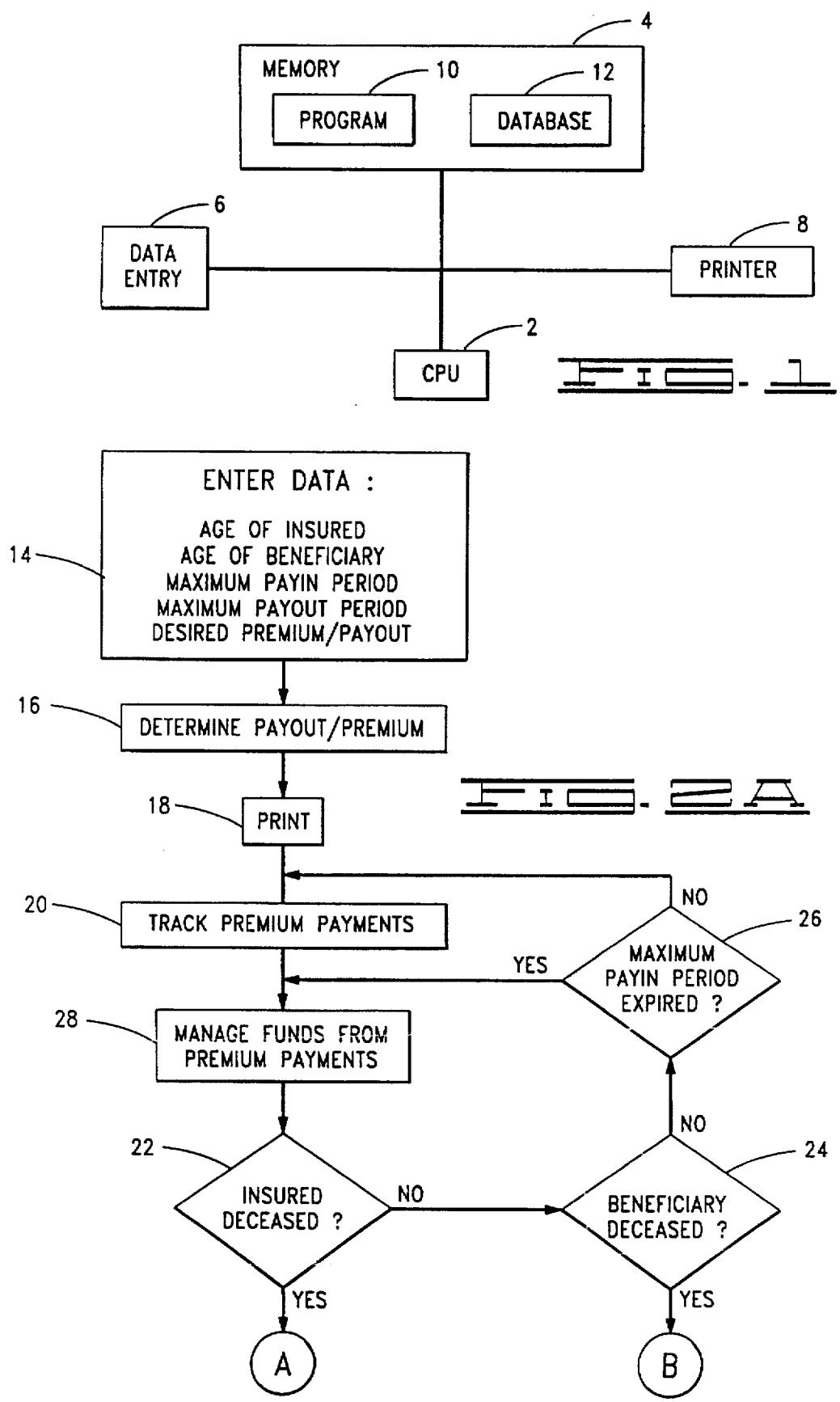

METHOD OF PROVIDING FOR A FUTURE BENEFIT CONDITIONED ON LIFE EXPECTANCIES OF BOTH AN INSURED AND A BENEFICIARY

BACKGROUND OF THE INVENTION

This invention relates generally to a data processing method for administering a program to provide benefits to beneficiaries who survive respective insureds. More specifically, the present invention relates to a method of providing for a future stream of payments solely to a beneficiary who survives an insured, wherein such payments are derived from premiums paid in response to conditions including the ages, from which life expectancies are measured, of both the insured person and one specific beneficiary.

Traditional methods for providing for one's future financial condition, or that of one's family, include those which utilize annuities and life insurance.

Using a single life annuity, a person (the annuitant) can obtain future payments during an annuity period based on amounts paid in. If the annuitant dies during the annuity period, no further payout is made under the annuity. That is, there is no beneficiary under a single life annuity.

Under other annuities, there can be obligations to pay during an annuity period even after the death of the annuitant. Such annuities can be for a fixed time period or for the remaining life of a designated beneficiary. If the annuity is for a fixed time period, the amount will be paid for the set period. Payout will go to a designated beneficiary or an estate if the annuitant dies during the set period. If the annuity is for the remaining life of a designated beneficiary, and the beneficiary survives the annuitant, then payments are made to the beneficiary but without further obligation upon the death of the beneficiary. Prior to the death of the annuitant, the beneficiary can be changed under these annuities.

For any of these annuity methodologies, the annuitant is entitled to the annuity if the annuitant lives long enough.

Additionally, for any of these annuity methodologies, the annuitant's estate is entitled to an amount based on what has been paid in if the annuitant dies before the annuity period. Thus, prior to the annuity period the annuity policy has a "cash value."

Pricing of these annuities depends on the amounts desired to be received in the future (or the amounts to be paid in can be defined first and the amounts to be received in the future determined in response). That is, for a given desired future benefit, a certain present payment is determined in accordance with conventional actuarial principles. This typically involves a time factor based on the period from the then present time to the beginning of the annuity period as related solely to the annuitant. That is, if an annuity is purchased for a 25-year-old annuitant to receive a certain payout beginning when the annuitant is 65, the price of the annuity will be different than for a 55-year-old annuitant under otherwise identical conditions because the 25-year-old has a longer period for investment growth to accrue to his or her benefit than does the 55-year-old (i.e., 40 years versus 10 years if both were to survive to 65). These different time periods also affect pricing in that even if both a 25-year-old and a 55-year-old had to pay in the same total amount for identical annuities, the 25-year-old would have a smaller periodic payment (e.g., $ total/40 years vs. $ total/10 years) if the total were to be paid in over time.

As to payout between a single life annuity and an annuity providing for payout to a survivor after the death of the annuitant, the latter has a lesser payout than the former. For example, whereas relative to a $1,000.00 monthly payout for a single life annuity, a joint survivorship annuity potentially benefitting the annuitant's spouse, for example, may have a monthly payout of only $750.00 to the annuitant. The $250.00 differential is the cost for the survivor benefit, which survivor benefit is even less than the $750.00 (e.g., $375.00). This exemplifies what a person's choices may be under a non-contributory retirement plan. The person can select either a higher paying single life annuity to the exclusion of a beneficiary, or the person can select a lower paying joint survivorship annuity which provides for a survivor, albeit at an even lower payout to the survivor. Furthermore, under the joint survivorship annuity, the $250.00 reduction (or other differential relative to a single life annuity) continues even if the beneficiary predeceases the annuitant.

In methods for providing for a future payment to a beneficiary using life insurance, a person can obtain a certain payment for a designated beneficiary upon the death of the insured. Prior to the death of the insured, the beneficiary can be changed. The future amount to be paid upon the death of the insured is fixed and the obligation to pay the full amount is certain. This obligation is certain because the amount of the insurance is to be paid even if there is no surviving beneficiary; then the payment would be to the insured's estate. One or more payments, or premiums, to be made to obtain life insurance are determined in response to one or more factors, typically including the sex, age and health of the insured.

One type of life insurance is referred to as whole life or permanent life insurance. Typically, an amount to be paid upon death is set and a premium schedule of fixed periodic amounts is then defined whereby the coverage is maintained as long as the premiums are paid and thereafter once all the scheduled premiums are paid. As the premiums are paid, a "cash value" accrues. This cash value can be redeemed by surrendering the insurance coverage.

Another type of life insurance is term life insurance. This provides life insurance for a limited period (e.g., one year) in return for a premium paid at that time (e.g., one premium paid at the beginning of the year of coverage). No cash value accrues under term life insurance so the only recipient of proceeds from term life insurance is the designated beneficiary or the insured's estate. Whereas the premiums for permanent life insurance are typically fixed amounts, term insurance premiums increase as the insured ages.

Pricing in both conventional annuity and life insurance methodologies is related solely to the insured. Regardless of the particular actuarial principles, analyses and computations applicable to one of the aforementioned conventional methods, as a particular insured grows older, it may become more difficult for the insured to use one of these conventional methods. For example, even if the total cost under a particular annuity method were the same for a person regardless of whether he or she were 25 or 55, the periodic burden at 55 would be greater than at 25 if the person had to pay in the amount over time. That is, as mentioned above, the person at 55 would have larger periodic payments from age 55 to a specified future date than the person would have had if periodic payments had been made at the same frequency from age 25 to the same future date. Such greater burden is clearly evident in term life insurance pricing, which rises with age regardless of when the first term coverage was obtained. This greater burden can price older potential insureds out of the market for amounts of future benefit they may need, which is significant because many people do not start to make definite plans about future financial needs until they are older.

In view of the foregoing, there is the need for a new method by which an older person can provide for future payments for a beneficiary at a lesser burden than by using the aforementioned traditional methods, whereby future financial security can be more readily obtained at an older age.

SUMMARY OF THE INVENTION

The present invention overcomes the above-noted and other shortcomings of the prior art by providing a novel and improved data processing method for administering a program to provide benefits to beneficiaries who survive respective insureds. More particularly, the present invention provides a method of providing for a future stream of payments (e.g., monthly payments) solely to a specific, unchangeable beneficiary who survives an insured, wherein such payments are derived from premiums paid in response to conditions including at least the ages of both the insured person and the one specific beneficiary. Basing the methodology on both the insured and a specific beneficiary results in relatively lower pricing while still providing for the future of the beneficiary.

The present invention provides for more efficient and flexible financial planning. With regard to the aforementioned example of the choices previously available to a person with a non-contributory retirement plan, the person can now select the higher paying single life annuity and yet obtain beneficiary protection at a lower relative cost than if the joint survivorship annuity had been used. Referring to the above example, the person could receive the $1,000.00 monthly payments under a single life annuity purchased via the retirement plan. The person could additionally use the present invention, at a cost less than the $250.00 referred to above with regard to a joint survivorship annuity, to provide for a surviving beneficiary an amount at least equal to what would have been provided under the joint survivorship annuity. Furthermore, using the present invention, any further cost for obtaining beneficiary protection ceases if the beneficiary predeceases the annuitant of the single life annuity.

The present invention method comprises determining for each insured, by digital data processing and in response to actuarial mortality data for both the insured and the respective beneficiary, a respective premium periodically required for participation in the program. For participation, a respective premium is payable only during the shortest of the remaining life of the insured, the remaining life of the beneficiary, and a predetermined maximum premium payment period. The method further comprises entering participation payment data and managing by digital data processing participation payments to provide for payouts only to beneficiaries who survive respective insureds. The method also includes entering data about the death of insureds and survival by the respective beneficiaries. Upon death of an insured and survival by the respective beneficiary, periodic payout data is determined for the respective surviving beneficiary. The method further comprises generating by digital data processing, in response to the determined periodic payout data, periodic payouts only to the respective surviving beneficiary.

The invention can be more broadly defined as comprising the following steps: identifying an insured and a beneficiary; determining, in response to both the age of the insured and the age of the beneficiary, a premium to be paid periodically during the shortest of the remaining life of the insured, the remaining life of the beneficiary, and a predetermined time period; and retaining at least a portion of a paid premium in a financial reserve from which a future stream of payments is to be made solely to the beneficiary upon the condition that the beneficiary survives the insured.

Another definition of the present invention is as a method, with the aid of a digital computer system including a printer, of preparing a policy for insuring a future stream of payments solely to a beneficiary who survives an insured named in the policy. This method comprises: acquiring identification of an insured, a beneficiary, the age of the insured, the age of the beneficiary, a maximum premium payment period, a maximum payout period, and a selected one of a premium payment and a minimum payout; applying the acquired identifications to the digital computer system; acquiring data defining information about premiums and payouts responsive to both the age of an insured and the age of a beneficiary; storing the acquired data in the digital computer system; actuating the digital computer system to determine a specific combination of a premium and a payout in response to the acquired identifications applied to the digital computer system and the acquired data stored in the digital computer system; and actuating the printer to print the policy at the determined specific combination of premium and payout.

Therefore, from the foregoing, it is a general object of the present invention to provide a novel and improved data processing method for administering a program to provide benefits to beneficiaries who survive respective insureds. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a block diagram of a data processing computer system which can be used for implementing the method of the present invention.

FIGS. 2A and 2B are a flow chart of a data processing method in accordance with the present invention for administering a program to provide benefits to beneficiaries who survive respective insureds.

DETAILED DESCRIPTION OF PREFERRED EMBODIMENTS

Figure 2B:
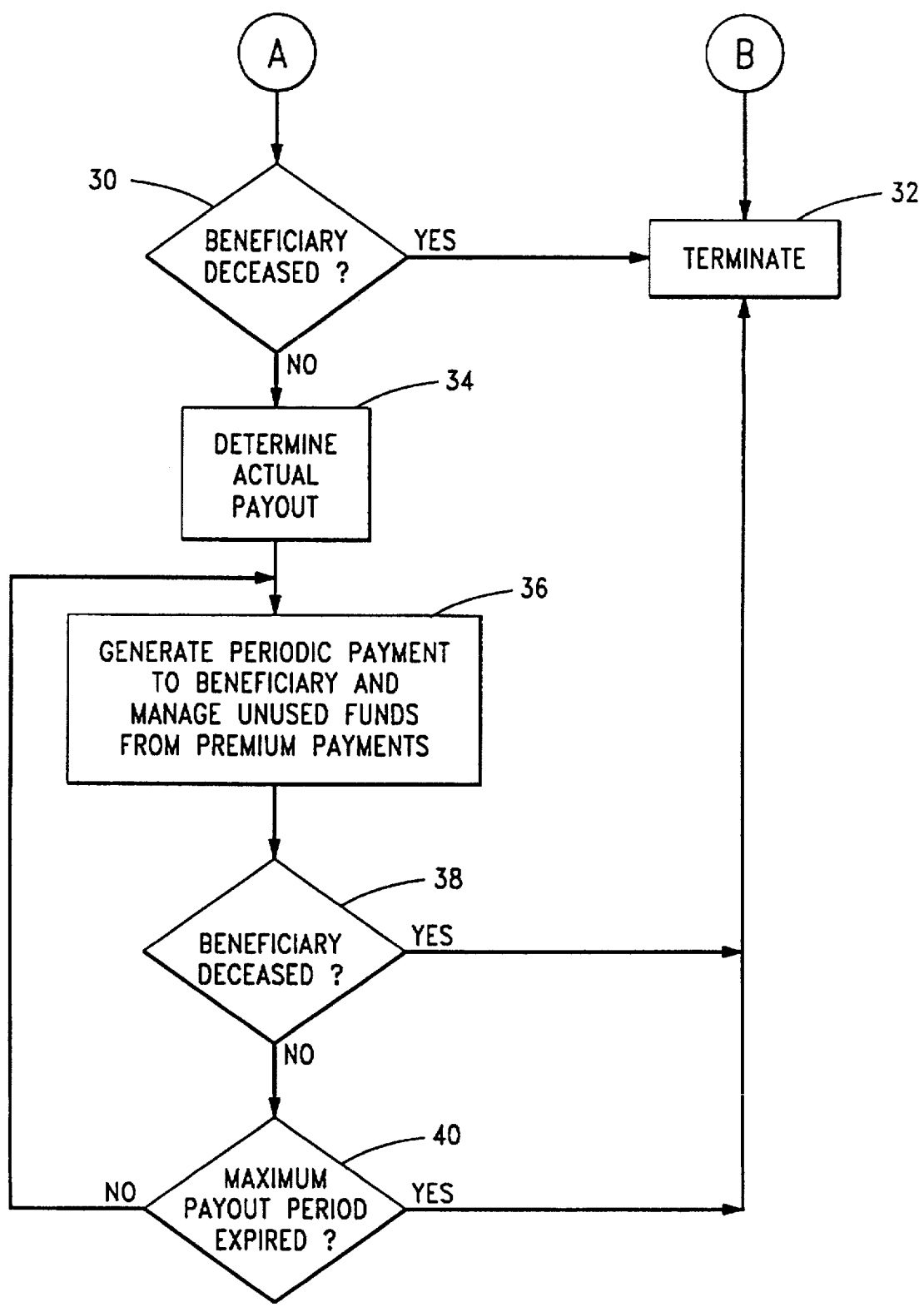

The present invention is an automated data processing method for administering a program to provide benefits to beneficiaries who survive respective insureds. The specific method of the invention provides for a future stream of payments solely to a beneficiary who survives an insured. This is accomplished in a particular implementation by creating a reversionary annuity conditioned on life expectancies of both the individual insured and the respective specific beneficiary, who in the particular implementation is assumed to be the insured's spouse; however, the present invention can be applied to other multiple life expectancy conditions so that it is not limited to the aforementioned specific assumption. The present invention is also not limited to a reversionary annuity as the method of the present invention can be implemented or used with other insurance concepts (e.g., group plans).

The present invention is implemented with the aid of a digital computer system to perform digital data processing in accordance with the method of the present invention. One example of such a system is represented in FIG. 1. The illustrated digital computer system includes a central processing unit (cpu) 2 having data, address and control buses and connections to which memory means 4, data entry means 6 and output means 8 are connected for control by the cpu 2.

The memory 4 includes a main operating program 10 under which the cpu 2 operates. The main operating program 10 includes conventional programming for the particular cpu 2 used, and it also includes the particular application program implementing the method of the present invention as further described below. Based on the description of the invention set forth in this specification, conventional programming languages and techniques can be used by those skilled in the art to write a specific application program for specifically implementing the method of the present invention.

The memory 4 also includes encoded signals defining the means by which premium (pricing) and payout (benefit to surviving beneficiary) data are determined in the preferred embodiments of the present invention. These signals can be part of the stored program 10, but in FIG. 1 they are identified as database 12. In the implementation as a database, these signals in effect provide look-up tables keyed to particular input parameters so that premium and payout data are obtained from predetermined numerical data in the database in response to particular input data. Alternatively, the means by which premium and payout information are obtained can be implemented with mathematical equations encoded and stored in the memory 4 and defined by parameters corresponding to the input data. The computer system solves these equations using specific input data to obtain corresponding premium and payout information. The database and equation implementations can be used separately or in combination.

The memory 4 further includes additional memory space for working space and for storage of input data entered with regard to particular insureds and beneficiaries.

The data entry means 6 includes any suitable device or combination of devices. Examples include a keyboard, a magnetic tape, and a floppy disk.

The output means 8 includes any suitable device or combination of devices. One example is a cathode ray tube (CRT) monitor. A particularly desired device is a printer which is the output device 8 specifically identified in FIG. 1.

The components of the digital computer system represented in FIG. 1 can be particularly implemented by any suitable devices capable of performing the digital data processing of the present invention. The computer system of a particular implementation is a mainframe computer, but it is contemplated that any other class (e.g., microcomputer, minicomputer) of computer can be used if it includes suitable components to handle the quantity of data and desired operating speed. It is to be noted that the invention can be implemented with systems having single (as shown in FIG. 1) or multiple central processing units and associated devices. Multiple systems can have the respective subsystems utilized within one or more networks or individually.

The method of the present invention will now be described with reference to the flow chart of FIGS. 2A and 2B. As mentioned, this method can be implemented using the digital computer system of FIG. 1.

The method of the invention will be described with reference to a pair of people including an insured and a beneficiary. In actual implementation there will be many such pairs preferably sufficient to define a suitable statistical universe for conventional actuarial principles to be validly applied. As to each pair, one and only one specific insured and one and only one specific beneficiary are identified. In the preferred embodiments, this includes acquiring identification of an insured and a beneficiary (e.g., names, genders), the age of the insured, the age of the beneficiary, a maximum premium payment period (also referred to herein as the maximum payin period), a maximum payout period, and a selected one of a desired premium payment and a desired minimum payout. In a particular implementation, the identification also includes a health factor (e.g., smoker or non-smoker) for at least the insured and preferably for both the insured and the beneficiary.

As to the age factor, in a particular implementation the age of the insured must be within the range of 40 to 70 as of the last birthday of the insured, and the age of the beneficiary must be within fifteen years of the age of the insured. This particular implementation is also implemented by assuming the insured and beneficiary have opposite gender and are married to each other. These limitations are not applicable to the broader aspects of the present invention.

Also with regard to a particular implementation, the maximum premium payment period is selectable by the insured as either ten years or twenty years, but neither of these specific time periods is limiting of the broader scope of the invention.

By way of further example but again not limiting of the broader scope of the invention, in a particular implementation, the maximum payout period is selectable by the insured as either ten years or the life of the beneficiary.

As to the identification of a desired premium or a desired benefit (payout), if a desired premium is selected, then the payout is determined in the present invention. If a desired payout is selected, the method of the present invention determines the corresponding premium to be paid. In a particular implementation, the premium and payout are defined as respective monthly dollar amounts; however, other respective periods and monetary denominations can be used.

The acquired identification data is entered via data entry means 6 into memory 4 of the digital computer system as represented at block 14 in FIG. 2A. Inputting or applying the aforementioned acquired identifications to the programmed digital computer system includes encoding and storing in the computer signals specifying the ages of the insured and the beneficiary; encoding and storing in the computer signals specifying the selected maximum premium payment period; encoding and storing in the computer signals specifying the selected maximum payout period; and encoding and storing in the computer signals specifying the selected one of a desired premium and a desired minimum payout. Any other needed identification data (e.g., gender, health) is likewise encoded and stored.

With the entered data, the method further comprises generating an output from the computer in response to the input data. The output identifies a minimum payout and a premium. This requires steps of determining the minimum payout or the premium in response to the other being given and of printing a report or policy for the insured as shown in FIG. 2A by blocks 16, 18, respectively.

As to premium/payout determining step 16, in a particular implementation a fixed minimum periodic payout is determined in response to desired periodic premium data having been selected and entered. The fixed minimum periodic payout is the guaranteed minimum amount to be paid to the beneficiary during any time period the beneficiary survives the insured subject to the maximum payout period that has been specified in the entered data. For example, if the insured desires to pay $250.00 per month, the method determines a fixed minimum periodic payout (e.g., $650.00 per month) guaranteed to be paid to the beneficiary if the beneficiary survives and subject to the selected maximum payout period (e.g., ten years).

If instead of the desired premium being entered a desired minimum periodic payout is selected and entered, a periodic premium to be paid for not more than the specified maximum premium payment period is determined. In a particular implementation, the amount of the periodic premium is fixed whereby the payment amount remains constant.

Given a desired payout or premium, the determination of the other is made. This determination is made by digital data processing and in response to one or more of the aforementioned identification factors for both the insured and the respective beneficiary. For example, the ages of both can be applied to actuarial mortality data acquired from known actuarial principles as the primary pricing factor. Although known actuarial data is preferably used to implement the present invention, any specific such data, its development and the underlying actuarial principles and equations do not form part of this invention. Thus, specific numerical data and equations referred to herein can be used in implementing the present invention but they do not define or limit the invention. Actuarial details referred to herein have been provided by Allen Bailey & Associates, Inc. of Austin, Tex. In general, this data defines information about premiums and payouts in response to both the age of the insured and the age of the beneficiary (in a particular implementation, the premium and payout data is also based on gender and health factors and other known factors, see the Example at the end of this specification). The acquired data is stored in the digital computer within the memory as explained above. It is used by actuating the digital computer to determine a specific combination of a premium and a payout in response to the acquired identifications stored in the digital computer for the respective insured/beneficiary pair. Since the premium and payout data are directly related, one can be found given the other along with the other defined parameters.

The actuarial data can be in the form of actuarial equations as explained above. To determine a premium, these equations are solved in the computer system in response at least to the ages of both the insured and the beneficiary. In a particular implementation, the fixed minimum periodic payout is determined by multiplying the current monthly payout value at the time of issue by the ratio of the annualized premium per $100 of current monthly income to the Commissioner's Reserve Valuation Method (CRVM) beta net premium per $100 of monthly income. The CRVM beta net premium is the guaranteed maximum premium determined with regard to the input data pertaining to both the insured and the beneficiary. The current monthly payout is the actual payout that would be made if the insured were to die immediately after the policy is issued. The current monthly payout value is set on a periodic basis (e.g., annually) in response to any suitable factors, such as including the then current investment projections as to what investment returns can be expected during the period. The actual payout can be greater than the guaranteed minimum due to realized investment gains, if any, which arise due to the managing step described below. If the premium is to be determined given a desired payout, the foregoing formula is used to solve for the annualized premium. This annualized premium may be derived either on a current or a guaranteed basis.

The actuarial data can be in the form of the database 12 as explained above. The database includes encoded signals defining premium amounts for respective combinations of insured age, beneficiary age, maximum premium payment period, maximum payout period, periodic payout amount and other identification data if used. Examples of such data are given in the particular example at the end of this specification. This data is obtained by using the aforementioned actuarial equations.

Because the premium/payout data for a respective pair of people is determined based on both the insured and the beneficiary, the beneficiary cannot be changed under the preferred embodiment of the method of the present invention (of course, the insured cannot be changed as well, but that is conventional).

Once the premium/payout data are known from the foregoing steps, a report or policy for the insured is obtained by actuating the printer 8 in the computer system of FIG. 1. A particular implementation of the printed report or policy lists the age of the insured, the age of the beneficiary, the maximum premium payment period, the maximum payout period, the fixed periodic premium, and the fixed minimum periodic payout. Other information, including gender and health data, can also be listed.

As premium payments are received, participation payment data is entered in the computer system. Data as to death of an insured and death/survival of the respective beneficiary is also entered. This information is necessary in the preferred embodiments wherein a respective premium is due periodically for continued participation in the program administered within the present invention, but only during the shortest of the remaining life of the insured, the remaining life of the beneficiary, and the predetermined maximum premium payment period. These aspects of the present invention are shown in FIG. 2A by blocks 20, 22, 24, 26.

With this tracking process, the present invention also includes managing the participation payments to provide for payouts to surviving beneficiaries. This managing function is implemented using the data processing of the computer system and by retaining at least a portion of a paid premium in a financial reserve from which a future stream of payments is to be made. This function is shown in FIG. 2A by block 28.

In a particular implementation, during the premium paying period reserves are calculated on the basis of the 1980 Commissioner's Standard Ordinary Mortality Table, age last birthday, male/female, smoker/nonsmoker for the insured while beneficiary mortality and the corresponding death benefits are based on the 1983 Individual Annuity Mortality Table "a". Both components are discounted at four and a half percent (4.5%) in a particular implementation and are based on the current monthly payout value at issue. The equation set forth above regarding block 16 is preferably used to obtain values to ensure exemption from a deficiency reserve requirement.

When an insured dies as determined at block 22 in FIG. 2A, the method then determines whether the beneficiary has survived the insured (see block 30 in FIG. 2B). If not, termination occurs with respect to that respective insured/beneficiary pair as shown at block 32 in FIG. 2B. This termination also occurs if the beneficiary predeceases the insured as shown by blocks 24 (FIG. 2A) and 32 (FIG. 2B).

If the beneficiary survives the insured, an actual payout to the beneficiary is determined as shown at block 34 in FIG. 2B. In the preferred embodiments, fixed periodic payout data for a respective surviving beneficiary is determined by data processing in response to the date of death of the insured. Although a minimum payout was selected at block 14 or computed at block 16, upon death of the insured and survival by the beneficiary an actual periodic payout is determined to account for actual increases if realized over the period from the initial premium payment to the death of the insured. In the preferred embodiments, the actual periodic payout cannot be less than the minimum payout determined through the method performed to block 18 in FIG. 2A.

In a particular implementation, the actual monthly income at death of the insured is determined by the following equation: the current monthly payout value at issue times the ratio of the annuity factor at six percent (6%) to the annuity factor at the then current payout rate. In no event will the current payout rate drop below four and a half percent (4.5%), which is the guaranteed minimum interest rate in this particular implementation.

The method of the present invention further comprises generating periodic payouts by digital data processing in response to the determined actual fixed periodic payout data. For example, monthly payments are made to the beneficiary. During this phase management of unused funds continues. In a particular implementation, payout reserves are calculated on the basis of the 1983 Individual Annuity Mortality Table "a", discounted at the interest rate guaranteed at the time of death (e.g., 6% in the aforementioned example). However, the interest rate used in determining reserves will not exceed the maximum valuation interest rate permitted by law. These functions are shown at block 36 in FIG. 2B.

As shown by blocks 38, 40 in FIG. 2B, periodic payouts are made only to a respective surviving beneficiary and only during the previously selected payout period (either life of the beneficiary or the shorter of the life of the beneficiary and ten years in the illustrated particular implementations). When one of these events occurs, termination as to the respective beneficiary occurs. Thus, the preferred embodiment of the method of the present invention provides no payment to the insured or anyone or anything (e.g., the insured's estate) other than the one specific beneficiary if such beneficiary survives the insured. That is, there is no "cash value" as that term is used above with reference to prior annuity and life insurance methods.

Following is an example showing sample data for a database from which premium/payout data can be obtained in accordance with the present invention. Actuarial equations are also listed.

EXAMPLE

Pricing Assumptions
Profit Objective
A profit objective was defined.

Premium Payment Options
Premium payment options were defined: either 10 years or 20 years.
Mode of Premium Payment
The mode of premium payment assumed in pricing was monthly automatic deposit.
Benefit Options
The benefit option was selected: either
a) lifetime of beneficiary but not more than 10 years or
b) lifetime of beneficiary
Insured Mortality
Preferred Nonsmoker: 82% of 75-80 Select & Ultimate mortality table for nonsmokers, ALB
Standard Nonsmoker: 110% of 75-80 Select & Ultimate mortality table for nonsmokers, ALB
Smoker: 100% of 75-80 Select & Ultimate mortality table for smokers, ALB
Beneficiary Mortality
1983 Individual Annuity Mortality Table "a", Male/Female, ALB
Withdrawal Rates
The lapse rates used were a variation of the Linton B table. The following lapse rates were used:

| Year | Lapse Rate | Year | Lapse Rate |
| --- | --- | --- | --- |
| 1 | 15.0% | 9 | 5.4% |
| 2 | 12.0 | 10 | 5.0 |
| 3 | 10.0 | 11 | 4.8 |
| 4 | 8.8 | 12 | 4.6 |
| 5 | 8.0 | 13 | 4.4 |
| 6 | 7.2 | 14 | 4.2 |
| 7 | 6.4 | 15+ | 4.0 |
| 8 | 5.8 | | |

Non-Underwriting Expenses
Non-underwriting expenses were defined.
Underwriting Expenses
Underwriting expenses by age and initial policy size were defined.
Investment Earning Rate and Discount Rate
The investment earning rate used for all years was 7.50%.
The discount rate used for all years was 15.0%.
Reinsurance
No reinsurance was assumed for the purpose of this example.
Commissions
A commission schedule was defined.
From the foregoing information, the following database was obtained.

Current Annual Premiums per $100 Monthly Income
Individual Rates
CRVM Reserves

| | | Lifetime Benefit Option - 10 Year Premium Payment Period | | | | | |
| --- | --- | --- | --- | --- | --- | --- | --- |
| Insured Age | Beneficiary Age | Male Pref NS Insured | Male Std NS Insured | Male Smoker Insured | Female Pref NS Insured | Female Std NS Insured | Female Smoker Insured |
| 55 | 45 | $307.95 | $372.66 | $505.41 | $200.18 | $237.50 | $315.66 |
| 55 | 50 | 283.67 | 343.70 | 470.55 | 180.63 | 214.20 | 287.67 |
| 55 | 55 | 255.79 | 309.76 | 429.28 | 159.01 | 188.06 | 255.68 |

Current Annual Premiums per $100 Monthly Income
Individual Rates
CRVM Reserves

| | | | | | | | |
|---|---|---|---|---|---|---|---|
| 55 | 60 | 224.42 | 270.98 | 381.49 | 136.09 | 160.13 | 220.86 |
| 60 | 50 | 391.86 | 475.07 | 604.41 | 254.15 | 302.02 | 374.46 |
| 60 | 55 | 356.77 | 432.21 | 554.27 | 226.56 | 268.22 | 335.28 |
| 60 | 60 | 316.47 | 382.42 | 495.76 | 196.42 | 231.16 | 291.99 |
| 60 | 65 | 271.15 | 326.22 | 429.22 | 163.81 | 191.46 | 245.06 |
| 65 | 55 | 509.65 | 618.97 | 744.96 | 311.83 | 368.57 | 430.03 |
| 65 | 60 | 456.09 | 553.23 | 670.26 | 273.60 | 321.36 | 377.52 |
| 65 | 65 | 395.25 | 478.16 | 584.70 | 231.57 | 270.00 | 320.05 |
| 65 | 70 | 328.41 | 395.71 | 489.74 | 186.95 | 216.63 | 259.82 |

10 Year Benefit Option - 10 Year Premium Payment Period

| Insured Age | Beneficiary Age | Male Pref NS Insured | Male Std NS Insured | Male Smoker Insured | Female Pref NS Insured | Female Std NS Insured | Female Smoker Insured |
|---|---|---|---|---|---|---|---|
| 55 | 45 | $185.22 | $219.82 | $288.71 | $132.35 | $153.80 | $196.98 |
| 55 | 50 | 181.79 | 215.95 | 285.39 | 127.04 | 147.71 | 191.02 |
| 55 | 55 | 175.71 | 208.81 | 278.95 | 119.07 | 138.33 | 181.38 |
| 55 | 60 | 165.68 | 196.64 | 267.27 | 108.25 | 125.39 | 167.40 |
| 60 | 50 | 243.39 | 289.85 | 359.49 | 173.78 | 202.81 | 244.71 |
| 60 | 55 | 238.05 | 283.27 | 353.34 | 165.91 | 193.12 | 234.95 |
| 60 | 60 | 227.88 | 270.72 | 341.32 | 153.75 | 178.21 | 219.52 |
| 60 | 65 | 210.74 | 249.68 | 320.36 | 136.47 | 157.44 | 197.27 |
| 65 | 55 | 328.83 | 392.67 | 463.65 | 223.17 | 259.56 | 297.09 |
| 65 | 60 | 318.22 | 379.56 | 450.67 | 210.46 | 243.57 | 280.89 |
| 65 | 65 | 299.10 | 356.23 | 427.38 | 190.72 | 219.53 | 256.07 |
| 65 | 70 | 268.88 | 319.66 | 389.59 | 163.48 | 187.41 | 221.94 |

Lifetime Benefit Option - 20 Year Premium Payment Period

| Insured Age | Beneficiary Age | Male Pref NS Insured | Male Std NS Insured | Male Smoker Insured | Female Pref NS Insured | Female Std NS Insured | Female Smoker Insured |
|---|---|---|---|---|---|---|---|
| 55 | 45 | $229.52 | $281.37 | $388.19 | $144.01 | $173.26 | $233.63 |
| 55 | 50 | 209.72 | 257.97 | 359.34 | 128.42 | 154.88 | 211.26 |
| 55 | 55 | 187.10 | 230.71 | 325.25 | 111.53 | 134.65 | 186.12 |
| 55 | 60 | 161.90 | 199.87 | 286.00 | 93.82 | 113.26 | 159.00 |
| 60 | 50 | 294.35 | 363.47 | 470.18 | 182.71 | 221.28 | 278.12 |
| 60 | 55 | 265.19 | 328.18 | 427.85 | 160.57 | 194.47 | 246.56 |
| 60 | 60 | 231.92 | 287.45 | 378.56 | 136.66 | 165.37 | 211.96 |
| 60 | 65 | 195.08 | 242.13 | 323.01 | 111.69 | 135.09 | 175.46 |
| 65 | 55 | 389.89 | 485.84 | 593.68 | 224.47 | 272.22 | 321.35 |
| 65 | 60 | 344.57 | 430.44 | 529.26 | 192.98 | 233.79 | 277.89 |
| 65 | 65 | 293.59 | 367.80 | 455.83 | 159.61 | 193.17 | 231.57 |
| 65 | 70 | 239.10 | 300.57 | 375.87 | 126.60 | 153.25 | 185.65 |

10 Year Benefit Option - 20 Year Premium Payment Period

| Insured Age | Beneficiary Age | Male Pref NS Insured | Male Std NS Insured | Male Smoker Insured | Female Pref NS Insured | Female Std NS Insured | Female Smoker Insured |
|---|---|---|---|---|---|---|---|
| 55 | 45 | $138.32 | $166.18 | $222.06 | $95.64 | $112.51 | $146.12 |
| 55 | 50 | 134.74 | 162.33 | 218.32 | 90.83 | 107.17 | 140.66 |
| 55 | 55 | 128.94 | 155.81 | 211.82 | 84.14 | 99.50 | 132.49 |
| 55 | 60 | 120.06 | 145.42 | 200.95 | 75.37 | 89.26 | 121.09 |
| 60 | 50 | 183.31 | 222.13 | 280.20 | 125.62 | 149.12 | 182.33 |
| 60 | 55 | 177.56 | 215.54 | 273.44 | 118.42 | 140.65 | 173.46 |
| 60 | 60 | 167.78 | 204.06 | 261.50 | 107.97 | 128.27 | 160.19 |
| 60 | 65 | 152.59 | 186.03 | 242.15 | 94.20 | 112.00 | 142.23 |
| 65 | 55 | 252.36 | 308.82 | 370.37 | 161.85 | 192.66 | 223.06 |
| 65 | 60 | 241.43 | 296.06 | 356.96 | 149.90 | 178.35 | 208.04 |
| 65 | 65 | 223.42 | 274.90 | 334.51 | 133.13 | 158.41 | 186.77 |
| 65 | 70 | 197.21 | 243.84 | 300.56 | 112.37 | 133.94 | 160.10 |

A. Reserve Formulae and Assumptions Prior to Death of the Insured

Prior to the death of the insured (i.e. during the joint lifetime of the insured and beneficiary), the reserves are calculated on a CRVM basis, utilizing 1980 CSO, Male/Female, Smoker/Nonsmoker ALB mortality rates for the primary insured and the 1983 Table "a", Male/Female, mortality rates for the beneficiary. Note that the beneficiary is assumed to be of opposite gender from the primary insured Valuation interest rates will be based upon Dynamic Interest Rates as defined for Life Insurance with a guaranteed duration of more than 20 years, per the Minimum Valuation Statutes.

The following notation will used in subsequent formulae and examples:

x issue age of primary insured y issue age of beneficiary t duration in policy years since issue n benefit period (10 if benefit period other than lifetime is elected)

h premium payment period (10 or 20 years)

$\ddot{a}_{x|y:n}$ present value of $1 per annum payable to y upon the death of x for a period of no more than n years; if n is omitted, the benefit period is over the lifetime of y $\ddot{a}_{xy:h}$ present value of $1 per annum payable while both x and y are alive, but limited to h years.

$c^*_{x|y}$ first year death benefit under reversionary annuity

This reversionary annuity utilizes the general theoretical formula $$\ddot{a}_y{}^{(12)} - \ddot{a}_{xy}{}^{(12)} - (D_{y+n}/D_y)*(\ddot{a}_{y+n}{}^{(12)} - \ddot{a}_{x:y+n}{}^{(12)})$$

in the determination of the present value of future benefits (at issue). However, for simplification the monthly payment annuity factors have been approximated with annual payment annuity factors in the reserve formulae. Since the present value of future benefits consists of the difference between annuity factors, this represents a reasonable assumption.

For the values of $a_y{}^{(12)}$ and $a_{y:n}{}^{(12)}$ below, the standard approximations of $a_y+11/24$ and $a_{y:n}+11/24*[(D_y-D_{y+n})/D_y]$, respectively, are used.

Reserves and Valuation Net Premiums, per $1 of monthly income at issue, are developed as follows:

1. For a premium payment period of $h = 20$ years and a lifetime benefit period:
$$\beta^{CRVM} = min\{\beta^{FPT}, P^{NL}_{x|y} + ({}_{19}P^{NL}_{x+1|y+1} - c^*_{x|y})/\ddot{a}_{xy:h}\} = \beta^{FPT}$$

$$c^*_{x|y} = \alpha^{CRVM} = (1 - 1/2q_y) * q_x * v * 12 * a_y{}^{(12)}$$

$$\beta^{FPT} = 12 * [\ddot{a}_{y+1} - \ddot{a}_{x+1:y+1}]/\ddot{a}_{x+1:y+1:h-1}$$

$$P^{NL}_{x|y} = 12 * [\ddot{a}_y - \ddot{a}_{xy}]/\ddot{a}_{xy:h}$$

$${}_{19}P^{NL}_{x+1|y+1} = 12 * [\ddot{a}_{y+1} - \ddot{a}_{x+1:y+1}]/\ddot{a}_{x+1:y+1:19}$$

$${}_tV_{x|y} = 12 * (\ddot{a}_{y+t} - \ddot{a}_{x+t:y+t}) - \beta^{CRVM} * \ddot{a}_{x+t:y+t:h-t}$$
for $x + t \leq 99$ and $1 \leq t < h$ $${}_tV_{x|y} = 12 * [\ddot{a}_{y+t} - \ddot{a}_{x+t:y+t}]$$ for $x + t \leq 99$ and $t \geq h$ $${}_tV_{x|y} = 12 * \ddot{a}_{y+t}$$ for $x + t > 99$ 2. For a 20 year premium payment period and a benefit period of $n = 10$ years:
$$\beta^{CVRM} = m\{\beta^{FPT}, P^{NL}_{x|y} + ({}_{19}P^{NL}_{x+1|y+1} - c^*_{x|y})/\ddot{a}_{xy:h}\} = \beta^{FPT}$$

$$\beta^{FPT} = 12 * [\ddot{a}_{y+1} - \ddot{a}_{x+1:y+1} - (D_{y+1+n}/D_{y+1}) * (\ddot{a}_{y+1+n} - \ddot{a}_{x+1:y+1+n})]/\ddot{a}_{x+1:y+1:h-1}$$

$${}_tV_{x|y} = 12 * [\ddot{a}_{y+t} - \ddot{a}_{x+t:y+t} - (D_{y+t+n}/D_{y+t}) * (\ddot{a}_{y+t+n} - \ddot{a}_{x+t:y+t+n})] - \beta^{CRVM} * \ddot{a}_{x+t:y+t:h-t}$$
for $x + t \leq 99$ and $1 \leq t < h$ $${}_tV_{x|y} = 12 * [\ddot{a}_{y+t} - \ddot{a}_{x+t:y+t} - (D_{y+t+n}/D_{y+t}) * (\ddot{a}_{y+t+n} - \ddot{a}_{x+t:y+t+n})]$$
for $x + t \leq 99$ and $t \geq h$ $${}_tV_{x|y} = 12 * \ddot{a}_{y+t:n}$$ for $x + t > 99$ 3. For a premium payment of $h = 10$ years and a lifetime benefit period:
$$\beta^{CRVM} = min\{\beta^{FPT}, P^{NL}_{x|y} + ({}_{19}P^{NL}_{x+1|y+1} - c^*_{x|y})/\ddot{a}_{xy:h}\}$$

$$= P^{NL}_{x|y} + ({}_{19}P^{NL}_{x+1|y+1} - c^*_{x|y})\ddot{a}_{xy:h}$$

$$\alpha^{CRVM} = 12 * (\ddot{a}_y - \ddot{a}_{xy}) - \beta^{CRVM} * (\ddot{a}_{xy:h}) - 1)$$

$$P^{NL}_{x|y} = 12 * [\ddot{a}_y - \ddot{a}_{xy}]/\ddot{a}_{xy:h} - 1$$

$${}_{19}P^{NL}_{x+1|y+1} = 12 * [\ddot{a}_{y+1} - \ddot{a}_{x+1:y+1}]/\ddot{a}_{x+1:y+1:19}$$

$$c^*_{x|y} = (1 - 1/2q_y) * q_x * v * 12 * a_y{}^{(12)}$$

$${}_tV_{x|y} = 12 * (\ddot{a}_{y+t} - \ddot{a}_{x+t:y+t}) - \beta^{CRVM} * \ddot{a}_{x+t:y+t:h-t}$$
for $x + t \leq 99$ and $1 \leq t < h$ $${}_tV_{x|y} = 12 * (\ddot{a}_{y+t} - \ddot{a}_{x+t:y+t})$$ for $x + t \leq 99$ and $t \geq h$ $${}_tV_{x|y} = 12 * \ddot{a}_{y+t}$$ for $x + t > 99$ 4. For a premium payment period of $h = 10$ years and a benefit period of $n = 10$ years:
$$\beta^{CRVM} = min\{\beta^{FPT}, P^{NL}_{x|y} + ({}_{19}P^{NL}_{x+1|y+1} - c^*_{x|y})/\ddot{a}_{xy:h}\}$$

$$= P^{NL}_{x|y} + ({}_{19}P^{NL}_{x+1|y+1} - c^*_{x|y})\ddot{a}_{xy:h}$$

$$\alpha^{CRVM} = 12 * [\ddot{a}_y - \ddot{a}_{xy} - (D_{y+n}/D_y) * (\ddot{a}_{y+n} - \ddot{a}_{x:y+n})] - \beta^{CRVM} * (\ddot{a}_{xy:h} - 1)$$

$$P^{NL}_{x|y} = 12 * [\ddot{a}_y - \ddot{a}_{xy} - (D_{y+n}/D_y) * (\ddot{a}_{y+n} - \ddot{a}_{x:y+n})]/\ddot{a}_{xy:h}$$

$${}_{19}P^{NL}_{x+1|y+1} = 12 * [\ddot{a}_{y+1} - \ddot{a}_{x+1:y+1} - (D_{y+1+n}/D_{y+1}) * (\ddot{a}_{y+1+n} - \ddot{a}_{x+1:y+1+n})]/\ddot{a}_{x+1:y+1:19}$$

$$c^*_{x|y} = (1 - 1/2q_y) * q_x * v * 12 * y_{y:n}{}^{(12)}$$

$${}_tV_{x|y} = 12 * [\ddot{a}_{y+t} - \ddot{a}_{x+t:y+t} - (D_{y+t+n}/D_{y+t}) * (\ddot{a}_{y+t+n} - \ddot{a}_{x+t:y+t+n})] - \beta^{CRVM} * \ddot{a}_{x+t:y+t:h-t}$$
for $x + t \leq 99$ and $1 \leq t < h$ $${}_tV_{x|y} = 12 * [\ddot{a}_{y+t} - \ddot{a}_{x+t:y+t} - (D_{y+t+n}/D_{y+t}) * (\ddot{a}_{y+t+n} - \ddot{a}_{x+t:y+t+n})]$$
for $x + t \leq 99$ and $t \geq h$ $${}_tV_{x|y} = 12 * \ddot{a}_{y+t:n}$$ for $x + t > 99$

B. Numerical Example of Reserve Calculations Prior to the Death of the Insured This example illustrates reserve calculations for an insured Male, Standard Nonsmoker, Issue Age 65, Beneficiary Issue Age 65, 20 year Premium Period, Lifetime Benefit Period, for $100 Monthly Income. The valuation interest rate used is 4.5%.

$$\beta^{CRVM} = \beta^{FPT} = 12 * 100 * [\ddot{a}_{66}^{IAM} - \ddot{a}_{66:66}^{CSO:IAM}]/\ddot{a}_{66:66:19}^{CSO:IAM}$$
$$=> 100 * 12 * (13.549 - 9.133)/8.897 = \$595.62$$

$$c*_{65:65} = \alpha^{CRVM} = (1 - 1/2\ddot{a}_{65}^{IAM}) * q_{65}^{CSO} * v *$$
$$12 * 100 * \ddot{a}_{65}^{(12)IAM}$$
$$=> [1 - 1/2 * (0.007336)] * 0.02225 * 1/1.045 *$$
$$12 * 100 * 13.329 = 339.31$$

$$P_{65:65}^{NL} = 12 * 100 * [\ddot{a}_{65}^{IAM} - \ddot{a}_{65:65}^{CSO:IAM}]/\ddot{a}_{65:65:20}^{CSO:IAM}$$
$$=> 12 * 00 * (13.871 - 9.482)/9.263 = 568.58$$

$$_{19}P_{66:66}^{NL} = 12 * 100 * [\ddot{a}_{66}^{IAM} - \ddot{a}_{66:66}^{CSO:IAM}]/\ddot{a}_{66:66:19}^{CSO:IAM}$$
$$=> 12 * 00 * (13.549 - 9.133)/8.897 = 595.62$$

$$_{1}V_{65:65} = 12 * 100 * (\ddot{a}_{66}IAM - \ddot{a}_{66:66}^{CSO:IAM} - \beta^{CVM} * \ddot{a}_{66:66:19}^{CSO:IAM})$$
$$=> [12 * 100 * (13.459 - 9.133)] -$$
$$(595.62 * 8.897) = -0.03 \approx 0.00$$

$$_{2}V_{65:65} = 12 * 100 * (\ddot{a}_{67}IAM - \ddot{a}_{67:67}^{CSO:IAM} - \beta^{CVM} * \ddot{a}_{67:67:18}^{CSO:IAM})$$
$$=> [12 * 100 * (13.221 - 8.784)] -$$
$$(595.62 * 8.530) = 243.76$$

$$_{5}V_{65:65} = 12 * 100 * (\ddot{a}_{70}IAM - \ddot{a}_{70:70}^{CSO:IAM} - \beta^{CVM} * \ddot{a}_{70:70:15}^{CSO:IAM})$$
$$=> [12 * 100 * (12.192 - 7.744)] -$$
$$(595.62 * 7.416) = 920.48$$

$$_{20}V_{65:65} = 12 * 100 * (\ddot{a}_{85}IAM - \ddot{a}_{85:85}^{CSO:IAM})$$
$$=> [12 * 100 * (6.682 - 3.483)] = 3,838.80$$

$$_{40}V_{65:65} = 12 * 100 * \ddot{a}_{105}^{IAM}$$
$$=> [12 * 100 * 2.35] = 2,821.20$$

C. Reserve Formulae and Assumptions During Payout of Annuity Benefits

While the monthly income is paid to the beneficiary, the reserves are calculated based on the present value of future guaranteed benefits, utilizing the 1983 Table "a", Male/Female, mortality rates based on the beneficiary's age.

The maximum Valuation interest rates that will be used will be based upon Dynamic Interest Rates as defined for single premium immediate annuities (i.e. for other annuities with no cash settlement options), in the Minimum Valuation Statutes.

The following notation will used in subsequent formulae and examples:

y attained age of beneficiary at commencement of benefit payments t duration in policy years since commencement of benefit payments n benefit period (10 if benefit period other than lifetime is elected)

For the values of $a_{y:n}^{(12)}$ below, the standard approximation of $$a_{y:n} + 11/24 * [(D_y - D_{y+n})/D_y]$$

is used.

Reserves per $1 of monthly income payable are developed as follows:

$$_{t}V_y = 12 * \ddot{a}_{y+t:n-t}^{(12)} \quad t \geq 0$$

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of providing streams of monetary payments solely to beneficiaries who survive respective insureds, comprising:

(a) identifying multiple actuarial factors for each of an insured and a respective unchangeable beneficiary and converting the identified actuarial factors into encoded signals stored in a computer;

(b) determining for the insured and the beneficiary, by digital data processing in the computer including correlating encoded signals representing actuarial mortality data stored in the computer with the encoded signals representing the identified actuarial factors for the insured and beneficiary, a respective fixed premium amount and a respective potential periodic payout amount corresponding to the respective fixed premium;

(c) transmitting a communication from the computer to at least one of the insured and beneficiary notifying of the determined fixed premium amount;

(d) monitoring for responses on behalf of the insured during the shortest of (1) the remaining life of the insured, (2) the remaining life of the beneficiary, and (3) a predetermined maximum premium period, said monitoring including:
receiving payments of the fixed premium amount; and
entering participation payment data in the computer in response to received payments of the fixed premium amount;

(e) retaining at least a portion of the received payments in a financial reserve from which a stream of monetary payments is made solely to the beneficiary if the beneficiary survives the insured;

(f) repeating, over time and for a plurality of pairs of insureds and beneficiaries, said steps (a) through (e); and during said time, selectively changing monetary payout data affecting potential periodic payout amounts without changing previously determined fixed premium amounts;

(g) entering in the computer data designating the date of death of an insured and whether the respective beneficiary is surviving;

(h) determining, for a surviving beneficiary of a pair for which all payments of the fixed premium amount have been received for the shortest of (1) the remaining life of the insured, (2) the remaining life of the beneficiary, and (3) a predetermined maximum premium period, an actual periodic payout amount for the surviving beneficiary in response to both the date of death of the respective insured and the then-current changed monetary payout data, wherein the actual periodic payout amount for a respective surviving beneficiary remains indeterminate until the date of death of the respective insured but which actual periodic payout amount is thereafter fixed at the determined actual periodic payout amount; and (i) transferring from the financial reserve by digital data processing, in response to determined actual periodic payout amounts, respective streams of monetary payments only to respective surviving beneficiaries.

2. A method as defined in claim 1, wherein the difference between the age of each insured and the age of the respective beneficiary is within a predetermined range.

3. A method as defined in claim 1, wherein said step (c) includes printing a policy schedule listing the age of the insured, the age of the beneficiary, the maximum premium payment period, the fixed premium amount, a maximum payout period and the potential periodic payout amount which is subject to change.

4. A method as defined in claim 1, wherein the actuarial factors include the age and gender of both insureds and beneficiaries.

5. A method as defined in claim 1, wherein the actuarial factors include the age and a health factor of both insureds and beneficiaries.

6. A method as defined in claim 1, wherein the actuarial factors include the gender and a health factor of both insureds and beneficiaries.

7. A method as defined in claim 6, wherein the actuarial factors further include the age of both insureds and beneficiaries and the difference between the age of each insured and the age of the respective beneficiary is within a predetermined range.

8. A method as defined in claim 7, wherein said step (c) includes printing a policy schedule listing the age of the insured, the age of the beneficiary, the maximum premium payment period, the fixed premium amount, a maximum payout period and the potential periodic payout amount which is subject to change.

9. A method, with the aid of a digital computer system including a printer, of preparing a policy for insuring a future stream of payments solely to a beneficiary who survives an insured named in the policy, comprising:

acquiring identification of an insured, one and only one invariable beneficiary, the age and gender and health of the insured, the age and gender and health of the beneficiary, a maximum premium payment period, a maximum payout period, and a selected one of a premium and a payout;

applying the acquired identifications to the digital computer system;

acquiring data defining information about premiums and payouts responsive to the age and gender and health of an insured, the age and gender and health of a beneficiary, and probabilities of a beneficiary surviving an insured;

storing the acquired data in the digital computer system;

actuating the digital computer system to determine a specific combination of a fixed premium and a potential payout in response to the acquired identifications applied to the digital computer system and the acquired data stored in the digital computer system;

actuating the printer to print the policy at the determined specific combination of fixed premium and potential payout; and periodically changing in the computer system the potential payout data and determining an actual payout for the beneficiary in response to the date of death of the insured, and the then-current potential payout data and the beneficiary surviving the insured.

10. A method of providing for future streams of payments solely to beneficiaries who survive respective insureds, comprising:

identifying age, gender and health factors for a plurality of insured and beneficiary pairs, and for each of the plurality of insured and beneficiary pairs also respectively identifying a maximum premium payment period, a maximum payout period, and a selected one of a premium and a payout, and creating in a computer a database of stored encoded signals representing the identified age, gender and health factors, the maximum premium payment periods, the maximum payout periods, and the selected premiums and payouts, wherein the insured and the beneficiary of a respective pair cannot be changed;

determining in the computer for each identified pair, in response to the age, gender and health factors of both the insured and the beneficiary of each pair and the respective maximum premium payment period, maximum payout period and selected premium or payout for each pair, and potential payout data stored in the computer, both a fixed premium, to be paid periodically during the shortest of the remaining life of the insured, the remaining life of the beneficiary, and the maximum premium payment period for the respective pair, and a potential payout;

notifying at least one of the insured and beneficiary of each pair of the determined fixed premium;

receiving premium payments and retaining at least a portion of paid premiums in a financial reserve from which future streams of payments are to be made solely to beneficiaries who survive their respective insureds;

periodically changing in the computer the potential payout data; and determining in the computer an actual payout for the beneficiary of a respective pair in response to the date of death of the respective insured of the pair, the then-current potential payout data, and the beneficiary surviving the insured.

11. A data processing method with which streams of monetary payments are made solely to beneficiaries who survive respective insureds who have purchased single life annuities via non-contributory retirement plans, comprising:

(a) identifying multiple actuarial factors for each of a plurality of insured and beneficiary pairs, wherein the plurality of pairs is sufficient to define a statistical universe for actuarial principles to be validly applied and wherein the insured and the beneficiary of a respective pair cannot be changed and wherein the insured of a respective pair has purchased a respective single life annuity via a respective non-contributory retirement plan;

(b) converting the identified actuarial factors into encoded signals stored in a computer, including:

encoding and storing in the computer signals specifying age, gender and health factors of the insured of each pair;

encoding and storing in the computer signals specifying age, gender and health factors of the beneficiary of each pair;

encoding and storing in the computer signals specifying a maximum premium payment period for each pair; and encoding and storing in the computer signals specifying a maximum payout period for each pair;

(c) storing in the computer encoded signals defining means by which premium and payout data are determined, including selecting from the group consisting of (1) storing in the computer a database providing look-up tables keyed to at least some of the actuarial factors so that premium data and payout data are obtained from predetermined numerical data in the database and (2) storing in the computer encoded mathematical equations defined by parameters corresponding to at least some of the actuarial factors so that premium data and payout data are obtained from solving the equations using specific input data for the respective pairs, wherein each premium amount within the premium data is less than a corresponding survivor benefit cost defined as the difference between an annuity payout amount to an annuitant under a single life annuity and an annuity payout amount to the annuitant under a joint survivorship annuity and each payout amount within the payout data is not less than a corresponding survivor benefit to a beneficiary under a joint survivorship annuity;

(d) determining for each pair of insured and beneficiary, by digital data processing in the computer including correlating the encoded signals defining means by which premium and payout data are determined with the encoded signals representing the identified actuarial factors for the respective insured and beneficiary, a respective fixed premium amount and a respective potential periodic payout amount corresponding to the respective fixed premium wherein the respective fixed premium amount is less than the difference between (1) the corresponding periodic payment the respective insured receives from the respective purchased single life annuity and (2) the corresponding periodic payment the respective insured would have received from a joint survivorship annuity if purchased by the insured from the non-contributory retirement plan, and further wherein the respective potential periodic payout amount is not less than the survivor benefit under the joint survivorship annuity if purchased by the insured from the non-contributory retirement plan;

(e) transmitting a communication from the computer to at least one of the respective insured and beneficiary notifying of the respective determined fixed premium amount;

(f) monitoring for responses on behalf of each respective insured during the shortest of (1) the remaining life of the insured, (2) the remaining life of the respective beneficiary, and (3) a respective predetermined maximum premium period, said monitoring including:
receiving payments of the fixed premium amounts; and
entering participation payment data in the computer in response to received payments of the fixed premium amounts;

(g) retaining at least a portion of the received payments in a financial reserve from which streams of monetary payments are made solely to beneficiaries who survive their respective insureds;

(h) selectively changing monetary payout data affecting potential periodic payout amounts without changing previously determined fixed premium amounts;

(i) entering in the computer data designating the date of death of an insured and whether the respective beneficiary is surviving;

(j) determining, for a surviving beneficiary of a pair for which all payments of the fixed premium amount have been received for the shortest of (1) the remaining life of the insured, (2) the remaining life of the beneficiary, and (3) a predetermined maximum premium period, an actual periodic payout amount for the surviving beneficiary in response to both the date of death of the respective insured and the then-current changed monetary payout data, wherein the actual periodic payout amount for a respective surviving beneficiary remains indeterminate until the date of death of the respective insured but which actual periodic payout amount is thereafter fixed at the determined actual periodic payout amount; and (k) transferring from the financial reserve by digital data processing, in response to determined actual periodic payout amounts, respective streams of monetary payments only to respective surviving beneficiaries.

* * * * *

UNITED STATES PATENT AND TRADEMARK OFFICE
CERTIFICATE OF CORRECTION

Patent No.:     5,754,980         Page 1 of 3
Dated:          May 19, 1998
Inventors:      Dean M. Potter and Thomas A. Dearmon It is certified that errors appear in the above-identified patent and that said Letters Patent is hereby corrected as shown below (line numbers are numbers of actual typed lines):

On the title page, item [19], delete –
"Anderson et al." and insert --Potter et al.--

On the title page of the patent, after "[75] Inventors:", delete "Bennett R. Anderson, Oklahoma City;".

Column 13, line 15, change "$(12)$" to --$(12)$--.

Column 13, line 54, change "CVRM" to --CRVM--.

Column 13, line 54, change "m" to --min--.

Column 13, line 54, change "$_{xy}h$" to --$_{xy:h}$--.

Column 14, line 5, insert --period-- after "payment".

Column 14, line 7, insert --)-- after "$C*_{x|y}$".

Column 14, line 9, insert --/-- after ")".

Column 14, line 11, delete ")" after "$_{xy:h}$".

Column 14, line 13, delete "-1".

UNITED STATES PATENT AND TRADEMARK OFFICE
CERTIFICATE OF CORRECTION

Patent No.: 5,754,980   Page 2 of 3

Dated: May 19, 1998

Inventors: Dean M. Potter and Thomas A. Dearmon

It is certified that errors appear in the above-identified patent and that said Letters Patent is hereby corrected as shown below (line numbers are numbers of actual typed lines):

Column 14, line 29, insert --)-- after "$C^*_{x|y}$".

Column 14, line 31, insert --/-- after ")".

Column 14, line 43, insert --a-- after "12*".

Column 15, line 8, change "ä" to --a--.

Column 15, line 14, change "00" to --100--.

Column 15, line 17, change "00" to --100--.

Column 15, line 19, change "($ä_{66}$IAM" to --($ä_{66}^{IAM}$--.

Column 15, line 19, insert --)-- after the term with the first occurrence of "CSO:IAM".

Column 15, line 19, change "CVM" to --CRVM--.

Column 15, line 19, change "a" to --ä--.

Column 15, line 20, change "13.459" to --13.549--.

Column 15, line 31, insert --$_{(rounding)}$-- below "$\cong$ 0.00".

UNITED STATES PATENT AND TRADEMARK OFFICE
CERTIFICATE OF CORRECTION

PATENT NO. : 5,754,980

DATED : May 19, 1998

INVENTOR(S) : Dean M. Potter and Thomas A. Dearmon

It is certified that error appears in the above-identified patent and that said Letters Patent is hereby corrected as shown below:

Column 15, line 23, change "$(ä_{67}IAM$" to --$(ä_{67}^{IAM}$--.

Column 15, line 23, insert --)-- after the term with the first occurrence of "CSO:IAM".

Column 15, line 23, change "CVM" to --CRVM--.

Column 15, line 23, change "a" to --ä--.

Column 15, line 27, change "$(ä_{70}IAM$" to --$(ä_{70}^{IAM}$--.

Column 15, line 27, insert --)-- after the term with the first occurrence of "CSO:IAM".

Column 15, line 27, change "CVM" to --CRVM--.

Column 15, line 32, change "$(ä_{85}IAM$" to --$(ä_{85}^{IAM}$--.

Column 15, line 37, change "2,821,20" to --2,821.20--.

Signed and Sealed this

Eleventh Day of May, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,754,980

DATED : May 19, 1998

INVENTOR(S) : Dean M. Potter and Thomas A. Dearmon

It is certified that error appears in the above-identified patent and that said Letters Patent is hereby corrected as shown below:

On the title page, item [19], delete -- "Anderson et al." and insert --Potter et al.--

On the title page of the patent, after "[75] Inventors:", delete "Bennett R. Anderson, Oklahoma City;".

Column 13, line 15, change "(12)" to --$(12)$--.

Column 13, line 54, change "CVRM" to --CRVM--.

Column 13, line 54, change "m" to --min--.

Column 13, line 54, change "$_{xy}h$" to --$_{xy:h}$--.

Column 14, line 5, insert --period-- after "payment".

Column 14, line 7, insert --)-- after "C*$_{x|y}$".

Column 14, line 9, insert --/-- after ")".

Column 14, line 11, delete ")" after "$_{xy:h}$".

Column 14, line 13, delete "-1".

UNITED STATES PATENT AND TRADEMARK OFFICE
CERTIFICATE OF CORRECTION

PATENT NO. : 5,754,980

DATED : May 19, 1998

INVENTOR(S) : Dean M. Potter and Thomas A. Dearmon

It is certified that error appears in the above-identified patent and that said Letters Patent is hereby corrected as shown below:

Column 14, line 29, insert --)-- after "$C^*_{x|y}$".

Column 14, line 31, insert --/-- after ")".

Column 14, line 43, insert --a-- after "12*".

Column 15, line 8, change "ä" to --a--.

Column 15, line 14, change "00" to --100--.

Column 15, line 17, change "00" to --100--.

Column 15, line 19, change "($ä_{66}$IAM" to --($ä_{66}^{IAM}$--.

Column 15, line 19, insert --)-- after the term with the first occurrence of "CSO:IAM".

Column 15, line 19, change "CVM" to --CRVM--.

Column 15, line 19, change "a" to --ä--.

Column 15, line 20, change "13.459" to --13.549--.

Column 15, line 21, insert --$_{(rounding)}$-- below "≅ 0.00".

UNITED STATES PATENT AND TRADEMARK OFFICE
CERTIFICATE OF CORRECTION

PATENT NO. : 5,754,980

DATED : May 19, 1998

INVENTOR(S) : Dean M. Potter and Thomas A. Dearmon

It is certified that error appears in the above-identified patent and that said Letters Patent is hereby corrected as shown below:

Column 15, line 23, change "($ä_{67}$IAM" to --($ä_{67}^{IAM}$--.

Column 15, line 23, insert --)-- after the term with the first occurrence of "CSO:IAM".

Column 15, line 23, change "CVM" to --CRVM--.

Column 15, line 23, change "a" to --ä--.

Column 15, line 27, change "($ä_{70}$IAM" to --($ä_{70}^{IAM}$--.

Column 15, line 27, insert --)-- after the term with the first occurrence of "CSO:IAM".

Column 15, line 27, change "CVM" to --CRVM--.

Column 15, line 32, change "($ä_{85}$IAM" to --($ä_{85}^{IAM}$--.

UNITED STATES PATENT AND TRADEMARK OFFICE
CERTIFICATE OF CORRECTION

PATENT NO. : 5,754,980

DATED : May 19, 1998

INVENTOR(S) : Dean M. Potter and Thomas A. Dearmon

It is certified that error appears in the above-identified patent and that said Letters Patent is hereby corrected as shown below:

Column 15, line 37, change "2,821,20" to --2,821.20--.

This certificate supercedes Certificate of Correction issued May 11, 1999

Signed and Sealed this

Twenty-first Day of September, 1999

Attest:

Q. TODD DICKINSON

*Attesting Officer*      *Acting Commissioner of Patents and Trademarks*